United States Patent
Gonnsen et al.

(10) Patent No.: US 11,720,721 B2
(45) Date of Patent: Aug. 8, 2023

(54) AIRCRAFT ASSEMBLY SYSTEM

(71) Applicant: AIRBUS OPERATIONS GMBH, Hamburg (DE)

(72) Inventors: Johannes Gonnsen, Hamburg (DE); Irene Bueno-Moreno, Hamburg (DE)

(73) Assignee: Airbus Operations GmbH

(*) Notice: Subject to any disclaimer, the term of this patent is extended or adjusted under 35 U.S.C. 154(b) by 452 days.

(21) Appl. No.: 15/730,606

(22) Filed: Oct. 11, 2017

(65) Prior Publication Data
US 2018/0039725 A1   Feb. 8, 2018

Related U.S. Application Data

(63) Continuation of application No. PCT/EP2016/062364, filed on Jun. 1, 2016.

(30) Foreign Application Priority Data

Jun. 1, 2015 (EP) .................................. 15170092

(51) Int. Cl.
*G06F 30/15* (2020.01)
*G06Q 10/06* (2023.01)
(Continued)

(52) U.S. Cl.
CPC ............ *G06F 30/15* (2020.01); *B64F 5/00* (2013.01); *G06Q 10/06* (2013.01); *G06Q 50/04* (2013.01); *G06F 2111/20* (2020.01)

(58) Field of Classification Search
CPC .... G06F 17/5095; G06F 2217/02; B64F 5/00; G06Q 10/06; G06Q 50/04
See application file for complete search history.

(56) References Cited

U.S. PATENT DOCUMENTS 8,180,597 B2 * 5/2012 Connor ................ G06F 30/00
                                                      703/1
8,560,287 B2 10/2013 Schmidt-Schaffer et al.
(Continued)

FOREIGN PATENT DOCUMENTS

CN    101272956 A    9/2008
CN    101866449 A    10/2010
(Continued)

OTHER PUBLICATIONS

Samaranayake, et al. "Aircraft Maintenance Planning and Scheduling: an Integrated Framework." Journal of Quality in Maintenance Engineering, 2012.*
(Continued)

*Primary Examiner* — Iftekhar A Khan
(74) *Attorney, Agent, or Firm* — Lerner David LLP

(57) ABSTRACT

An aircraft assembly system as described herein includes an input module, a database, and a processing unit. The input module is adapted for inputting customer-specific data and, in particular, parameters which relate to the expected time of delivery, the number of personnel working in the aircraft assembly system or an apparatus of the system which cannot be used. By applying description logics, the processing unit generates a manufacturing plan in accordance with a set of rules and the input parameters. In order to improve the manufacturing plan, input parameters may be changed by the system in an iterative process. This may provide for an efficient use of resources available.

10 Claims, 3 Drawing Sheets

(51) Int. Cl.
  *G06Q 50/04* (2012.01)
  *B64F 5/00* (2017.01)
  *G06F 111/20* (2020.01)

(56) References Cited

U.S. PATENT DOCUMENTS

| | | | |
|---|---|---|---|
| 9,141,650 B1* | 9/2015 | Nicks | G06F 16/2246 |
| 11,109,001 B2* | 8/2021 | Müller-Vogt | B64F 5/00 |
| 11,542,013 B2* | 1/2023 | Benthien | B60N 2/08 |
| 11,597,520 B2* | 3/2023 | Salmon | B64D 11/00155 |
| 2003/0061261 A1* | 3/2003 | Greene | G06Q 10/06 718/104 |
| 2004/0153295 A1* | 8/2004 | Lohmann | G05B 19/409 703/1 |
| 2007/0124009 A1* | 5/2007 | Bradley | G06Q 10/06 700/99 |
| 2008/0126171 A1* | 5/2008 | Baldwin | G06Q 10/06375 705/7.14 |
| 2008/0256788 A1 | 10/2008 | Glazebrook | |
| 2009/0030661 A1* | 1/2009 | Bouffiou | G05B 19/41865 703/2 |
| 2010/0268365 A1 | 10/2010 | Raviola et al. | |
| 2011/0022208 A1 | 1/2011 | Bouffiou et al. | |
| 2011/0161057 A1* | 6/2011 | Redondo Garcia | G06F 30/15 703/1 |
| 2011/0172795 A1* | 7/2011 | Hansen | G06Q 10/06 700/97 |
| 2012/0035975 A1* | 2/2012 | Sugimoto | G06Q 10/06 705/7.26 |
| 2012/0173210 A1* | 7/2012 | Schmidt-Schaffer | G06F 30/15 703/1 |
| 2012/0239354 A1* | 9/2012 | Sieben | G06F 30/15 703/1 |
| 2013/0066602 A1* | 3/2013 | Schmidt-Schaffer | B64F 5/00 703/1 |
| 2013/0067362 A1* | 3/2013 | Cowart | G06Q 10/06 715/763 |
| 2013/0158955 A1* | 6/2013 | Song | G06F 30/15 703/1 |
| 2014/0259596 A1 | 9/2014 | Senesac et al. | |
| 2014/0278270 A1 | 9/2014 | Savian et al. | |
| 2015/0199470 A1* | 7/2015 | Young | G06F 30/15 700/98 |
| 2016/0125107 A1* | 5/2016 | Druckman | G06F 30/23 703/2 |
| 2017/0061068 A1* | 3/2017 | Golshany | G06F 30/00 |
| 2018/0037339 A1* | 2/2018 | Gonnsen | B64F 5/10 |
| 2019/0121934 A1* | 4/2019 | Uyeda | G06F 30/20 |
| 2019/0311087 A1* | 10/2019 | Jackson | G06F 30/15 |

FOREIGN PATENT DOCUMENTS

| | | | | |
|---|---|---|---|---|
| CN | 102549607 A | 7/2012 | | |
| CN | 102867073 A | 1/2013 | | |
| CN | 103226789 A | 7/2013 | | |
| CN | 104050601 A | 9/2014 | | |
| DE | 102005030183 A1 * | 6/2005 | | G06Q 10/06 |
| DE | 102005030183 A1 * | 1/2007 | | G06Q 10/06 |
| DE | 102005030183 A1 | 1/2007 | | |
| KR | 20140101944 A | 8/2014 | | |

OTHER PUBLICATIONS

European Patent Office, European Search Report for EP Application No. EP15170092 dated Nov. 6, 2015.

International Searching Authority, International Search Report for International Application No. PCT/EP2016/062364 dated Aug. 12, 2016.

Rozhdestvensky AV, Samsonov OS. Design and optimization of aircraft assembling based on comprehensive simulation of manufacturing processes. In 29th Congress of the International Council of the Aeronautical Sciences, ICAS 2014 2014.

Search Report from Chinese Office Action of Application No. 201680031329.1 dated Aug. 4, 2020; 4 pages (pp. 2 & 3 categorizing cited references).

Liu et al. "Research on automatic processing and assembly of complex components of aircraft", Electronics World; Sep. 30, 2014; p. 21.

* cited by examiner

AIRCRAFT ASSEMBLY SYSTEM

CROSS-REFERENCE TO PRIORITY APPLICATIONS

This application is a continuation of international patent application number PCT/EP2016/062364, having an international filing date of Jun. 1, 2016, which claims priority to European patent application number EP 15170092.9, having a filing date of Jun. 1, 2015. The content of the referenced applications is incorporated by reference herein.

TECHNICAL FIELD

The present disclosure relates to the assembly of aircraft. More specifically, the present disclosure relates to an aircraft assembly system, a method for aircraft assembly, a program element and a computer-readable medium.

BACKGROUND

Configuration, design and assembly of an aircraft is a complex task. Computer-based tools, which are operated by a tool operator, are used to generate aircraft layouts, thereby observing customer-specific configuration data. The customer-specific configuration data allows a customer (user) to select, inter alia, interior equipment components, which are to be installed in the aircraft, as well as positions, in which the components are to be installed.

Such an interior equipment component may be a galley, a toilet module, a crew rest compartment, a cabin light, or a stowage compartment. The customer may also select the number of economy class passenger seats, the number of business class passenger seats and/or the number of first class passenger seats to be installed in the aircraft.

The customer may also select certain specific design parameters of the aircraft, such as interior equipment materials.

The aircraft manufacturing process, in the following also denoted as aircraft assembly, may have to meet certain process parameters, such as time of delivery, time frames for carrying out specific assembly tasks, the number of men available for working in the assembly line, manufacturing tasks to be performed, the selected elements for assembling the aircraft, availability of these elements, changes in the manufacturing chain or external events, such as non-available machines, non-available assembly halls, electric power available, material available, a reduced number of workers or the occurrence of unexpected emergencies, such as fire alarms, water damages, or storm losses. Therefore, aircraft assembly is complex.

BRIEF SUMMARY

It is an object of the present disclosure to provide for a more efficient aircraft assembly.

This object is achieved by the subject-matter of the independent claims. Developments of certain embodiments of the invention are stated in the dependent claims at the following description.

According to a first aspect of the present disclosure, an aircraft assembly system is provided, which comprises an input module, a database and a processing unit. The input module is adapted for inputting customer-specific design and/or configuration data relating to a configuration and/or a design of the aircraft and for inputting input parameters relating to at least one of expected time of delivery of the aircraft, the number of personnel working in the aircraft assembly system, an apparatus of the system which cannot be used, or resources available in the aircraft assembly system. The database comprises a set of rules for components available for installation in the aircraft, for the customer-specific design and/or configuration data, and for the input parameters. The processing unit is adapted for generating a manufacturing plan for assembling the aircraft in accordance with the set of rules.

The processing unit is, according to an exemplary embodiment of the present invention, also adapted for automatically varying the input parameters in order to change the manufacturing plan.

Such a change of the manufacturing plan may result in an improvement of the manufacturing plan, and in particular in a reduction of overall assembly costs or assembly time.

For example, the processing unit may be adapted for replacing an input parameter, which has been input into the system by a user, such as the expected time of delivery of the aircraft. Thus, the time of delivery may be changed to a future time or to an earlier time and, as a consequence, the expected time of delivery of another aircraft may also be changed, such that the resources available are used in the most efficient manner.

According to another exemplary embodiment of the present invention, the processing unit is further adapted for automatically varying the customer-specific design data and/or configuration data in order to change the design and/or the configuration of the aircraft and/or the manufacturing plan.

For example, the processing unit may be adapted for replacing components a user has selected for installation in the aircraft, by inputting respective customer-specific design and/or configuration data relating to that component, by other components, which differ from the selected components. Such a replacement may improve the overall design and/or configuration of the aircraft, or the manufacturing plan, or it may reduce the overall production/assembly costs and/or maintenance costs, or other properties of the aircraft, such as mechanical properties.

In other words, the system may be capable of generating aircraft manufacturing plans, which may include aircraft designs and configurations, which differ from what the user has initially selected, in particular if the changed design/configuration/manufacturing plan of the aircraft provides advantages over the prior design/configuration/manufacturing plan. Reasons for such an improvement may be that the new aircraft is less heavy, less costly, consumes less fuel, has an improved center of gravity position (which may help to save fuel), provides more passenger seats or storage space as compared to the prior aircraft, and/or is produced at reduced costs or by using a reduced amount of resources/time.

The system may use description logics for generating the manufacturing plan. More specifically, the system may use ontologies for generating the manufacturing plan. The ontologies may be defined by the description logics. The ontologies, and as a consequence also the description logics, define the types, properties and interrelationships of the components of the aircraft and of the input parameters.

The design data may comprise information about a specific design of a component of the aircraft to be installed in the aircraft, such as a shape or a material of the component.

Configuration data may comprise information about a type of the component to be installed in the aircraft or about a position, at which the component is to be installed in the aircraft.

It should be noted that the component may also be a "void space", where no interior equipment is to be installed.

The set of rules may comprise description logics for each component to be installed in the aircraft. In other words, each component may be related to a specific set of logical statements and rules, which defines the interrelation of the components to other components of the aircraft, and possible positions of installation thereof in the aircraft. These possible positions of installation may be related to a specific set of logical statements and rules, which defines the interrelation of the positions of installation to the whole cabin, to a door zone or a further dedicated sub-zone in the aircraft, for example.

The set of rules may also comprise description logics for the input parameters.

According to another exemplary embodiment of the present invention, the database comprises rules for components which are not available for installation in the aircraft, wherein the processing unit is adapted for selecting the specific set of rules for the components which are available for installation in the aircraft in the database and other rules which relate to different components are not selected. This selection may save computational costs during generation of the manufacturing plan.

According to another exemplary embodiment of the present invention, the processing unit is adapted for controlling an assembling apparatus of the aircraft assembly system, which apparatus is configured to assemble a part of the aircraft, in accordance with the manufacturing plan.

According to another exemplary embodiment of the present invention, the processing unit is further adapted for prioritizing the input parameters, and for changing only an input parameter which is of low priority.

According to another exemplary embodiment of the present invention, the set of rules comprises a sub-set of deterministic rules, which do not allow varying a position information of a component or an input parameter relating to that sub-set. Further, the set of rules comprises a second sub-set of non-deterministic rules, which do allow varying an input parameter relating to that sub-set.

Thus, only the non-deterministic rules may allow variations by the processing unit. The deterministic rules may not allow for such variations. Both groups of rules have to be observed at all times, at least according to this exemplary embodiment.

The system may be adapted for allowing a customer to select both, deterministic and non-deterministic rules, which are to be observed during generation of the manufacturing plan. The system may also be capable of allowing a user to change a non-deterministic rule into a deterministic rule. There may also be deterministic rules, which the user is allowed to disregard, in which the system does not observe them at all. However, there are also deterministic rules, which have to be observed at all times and cannot be disregarded, even if the user would like to do so.

According to an exemplary embodiment of the present invention, at least some of the rules of the set of rules describe ontologies of the components and input parameters and are based on description logics.

According to another exemplary embodiment of the present invention, the processing unit is further adapted for prioritizing the rules to be observed, wherein a rule which is of low priority is disregarded, if observing one or more of the low priority rules would result in a manufacturing plan which contravenes a higher priority rule. For doing so, the processing unit may observe key performance indicators, such as overall costs, fuel consumption, weight, and the system may be adapted to decide which rules need a higher prioritization than other rules. It should be noted that the priority of a specific rule may change if a component of the aircraft is replaced by another component, or if an input parameter is changed.

According to another exemplary embodiment of the present invention, the processing unit is adapted for performing an error check of the manufacturing plan generated, and for automatically varying the input parameters in order to correct the error or in order to improve the plan.

According to another exemplary embodiment of the present invention, the manufacturing plan also comprises testing tasks, i.e. time intervals reserved for testing one or more components of the aircraft during assembly of the aircraft.

According to another aspect of the present disclosure, a method for aircraft assembly is provided, in which customer-specific design and/or configuration data relating to a configuration and/or a design of the aircraft is input. Further, input parameters relating to at least one of expected time of delivery, the number of personnel working in the aircraft assembly system, an apparatus of the system which cannot be used or resources available in the aircraft assembly system are input. Further, a set of rules for components available for installation in the aircraft, for the customer-specific design and/or configuration data, and for the input parameters is provided. Then, a manufacturing plan for assembling the aircraft is generated in accordance with the set of rules.

Another aspect of the disclosure relates to a program element which, when being executed by a processor of an aircraft assembly system, instructs the processor to carry out the following steps: receiving customer-specific design and/or configuration data relating to a configuration and/or design of the aircraft, receiving input parameters relating to at least one of expected time of the delivery, the number of personnel working in the aircraft assembly system, an apparatus of the system which cannot be used or resources available in the aircraft assembly system; receiving a set of rules for components available for installation in the aircraft, for the customer-specific design and/or configuration data, and for the input parameters; and generating a manufacturing plan or assembling the aircraft in accordance with the set of rules.

According to another aspect of the disclosure, a computer-readable medium is provided, which comprises the above described program element.

A computer-readable medium may be a floppy disk, a hard disk, a CD, a DVD, an USB (Universal Serial Bus) storage device, a RAM (Random Access Memory), a ROM (Read Only Memory) and an EPROM (Erasable Programmable Read Only Memory). A computer-readable medium may also be a data communication network, for example the Internet, which allows downloading a program code.

These and other aspects of the present disclosure will become apparent from and elucidated with reference to the embodiments described hereinafter.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Exemplary embodiments of the present invention will now be described in the following, with reference to the following drawings. The illustration in the drawings is schematic. In different drawings, similar or identical elements are provided with the same reference numerals.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
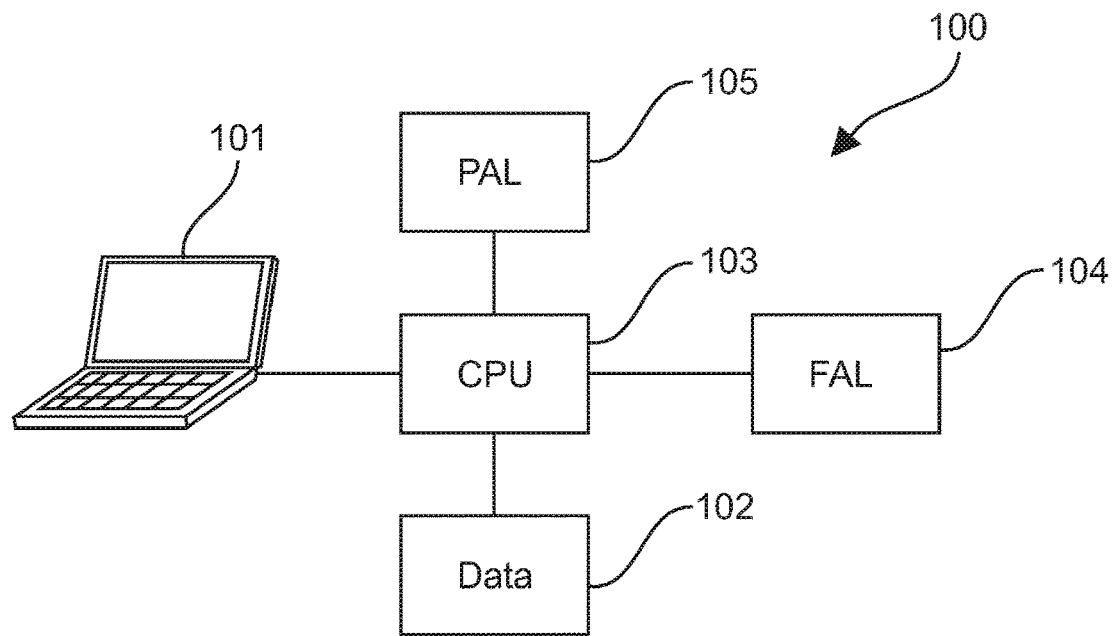
FIG. 1 shows an aircraft assembly system according to an exemplary embodiment of the present invention.

FIG. 1 shows an aircraft assembly system 100. The aircraft assembly system 100 comprises an input module 101, for example a workstation or a notebook. The input module 101 is adapted for inputting customer-specific design and/or configuration data, and also input parameters, such as an expected time of delivery, the number of personnel working in the aircraft assembly system, time modules etc. Further, a database 102 is provided which comprises a set of deterministic and non-deterministic rules for components available for installation in the aircraft, for the customer-specific design or configuration data, and for the input parameters.

The database and the input module are connected to a processing unit 103 which generates a manufacturing plan for assembling the aircraft in accordance with the set of rules and in accordance with the parameters input by the user as well as the customer-specific design or configuration data. Also connected to the processing unit 103 is a final assembly line 104 and one or more preassembly lines 105. The manufacturing plan is used for controlling the preassembly line and the final assembly lines and for assigning resources, such as workers, machinery and assembly stations for aircraft assembly.

The system is capable of automatically generating a plurality of valid assembly schedules (which are part of the assembly plans), thereby observing different requirements and standard time modules.

Generation of the assembly plan is done with the help of description logics, which finds an optimum solution, i.e., an optimum manufacturing plan out of a huge solution set. All feasible production scheduling relationships are identified, according to the set of rules and the requirements of the specific user/manufacturer. Also, the most important performance indicators may be considered when generating the manufacturing plan, for example, overall cost, time of delivery, etc.

The complexity of the manufacturing process may depend on the cabin characteristics, which may also lead to different time frames.

Figure 2:
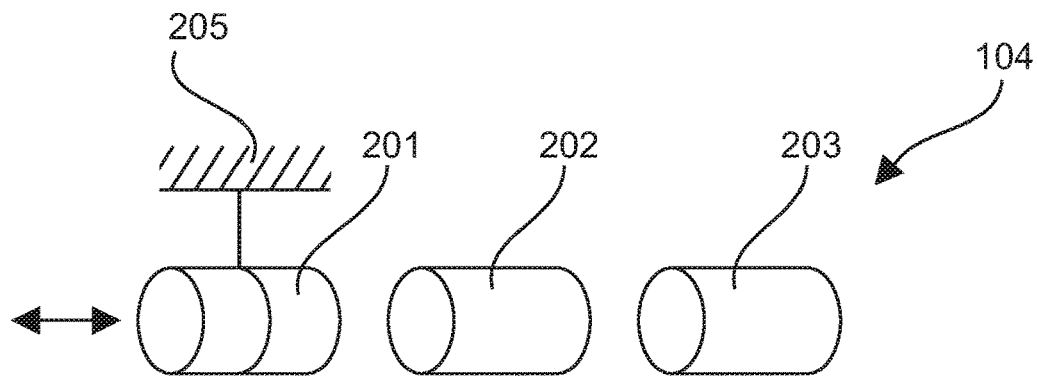
FIG. 2 shows a final assembly line of an aircraft assembly system according to an exemplary embodiment of the present invention.

FIG. 2 shows a final assembly line of an aircraft assembly system. The final assembly line 104 comprises an assembling apparatus 205, which assembles a part 201 of an aircraft 201, 202, 203.

This assembly apparatus 205 is controlled by the processing unit 103 (see FIG. 1).

Figure 3:
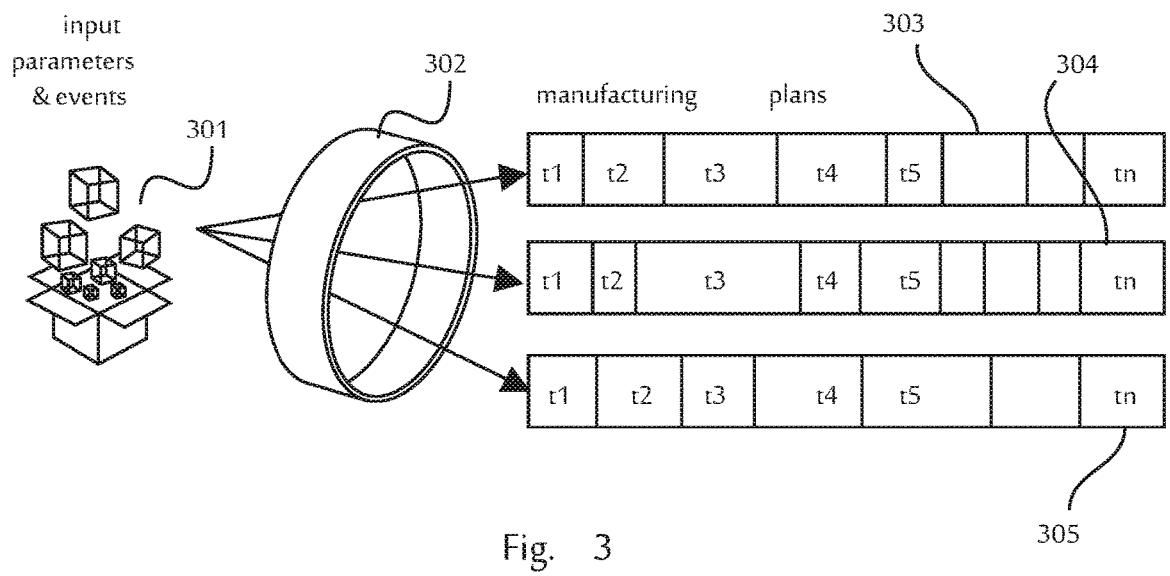
FIG. 3 shows a manufacturing plan generation according to an exemplary embodiment of the present invention.

FIG. 3 shows the generation of three different manufacturing plans 303, 304, 305, in accordance with input parameters and events 301 and in accordance with a set of rules 302 described by description logics.

The three manufacturing plans differ from each other, for example by assigning different manufacturing time slots (t1, t2, . . . ) and/or locations for specific assembly tasks.

The first manufacturing plan 303 has been generated by using the customer-specific design or configuration data and also the parameters, which have been input by the user, without any variations performed by the system.

The two following manufacturing plans 304, 305 have been generated by varying one or more of the customer-specific design or configuration data or one or more of the input parameters. The third manufacturing plan 305 may be the final manufacturing plan because it provides the most efficient aircraft assembly, although it uses slightly different input parameters and/or customer-specific design or configuration data.

In other words, the system may be programmed to produce a (slightly) different aircraft and/or to use different resources or timeslots than the ones, which have been selected by the user, in order to improve the final result. These changes may also affect assemblies of other aircraft, i.e., aircraft which have been ordered by different customers/users.

Figure 4:
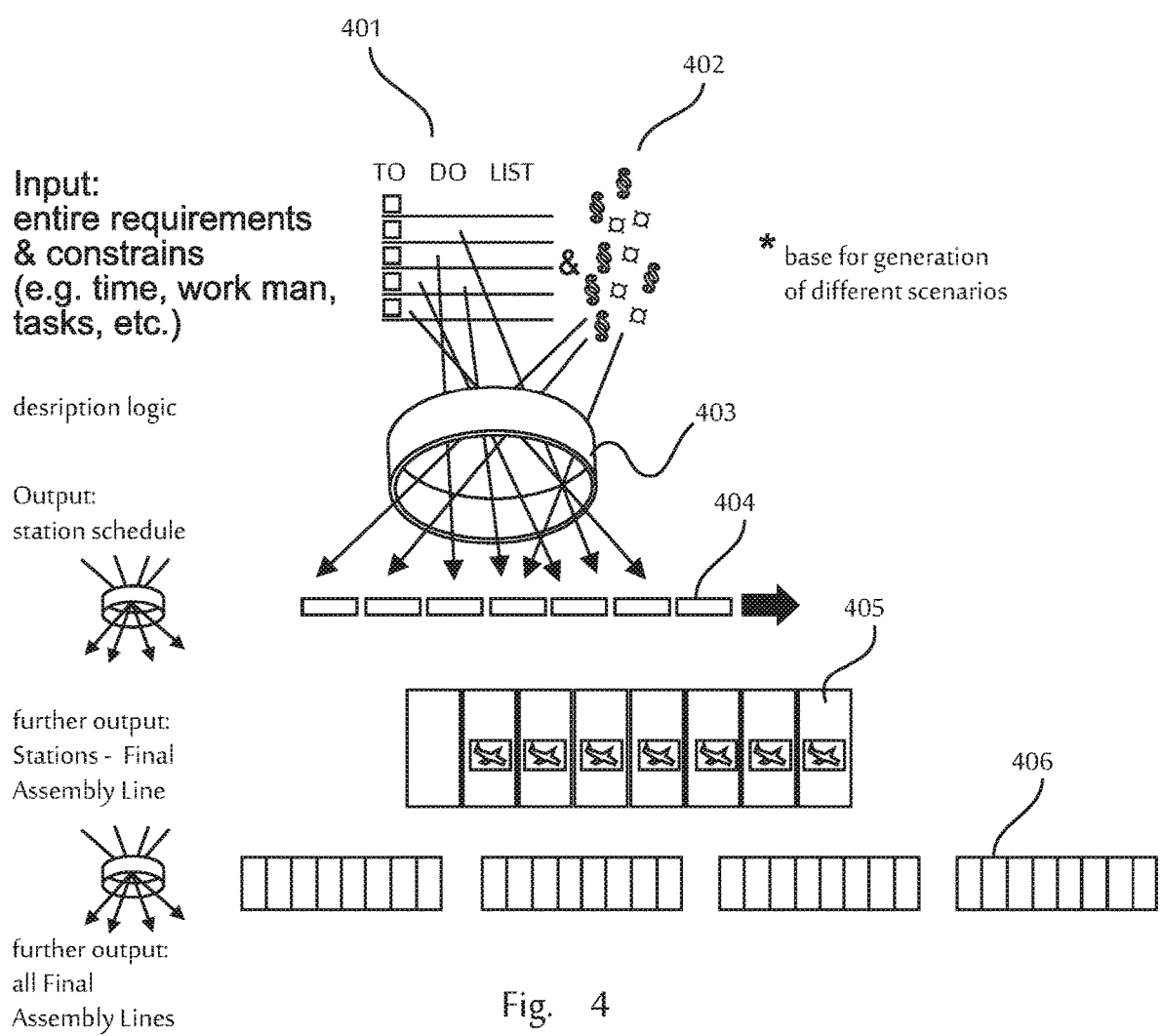
FIG. 4 shows the manufacturing plan generation according to an exemplary embodiment of the present invention.

FIG. 4 shows the generation of a manufacturing plan according to an exemplary embodiment of the present invention. Input parameters, such as a "To-do-list" 401, which relate to requirements and constraints, such as an expected time frame, the number of workers available, tasks to be carried out, etc., are input by a user. Further, a database is provided, which comprises a set of rules 402 to be applied. By using description logics 403, a manufacturing plan 404 is generated, which may comprise a station schedule. Also, stations in the final assembly line may be identified in module 405, where the final assembly of the aircraft is going to take place. Still further, all final assembly lines 406 may be assigned or even re-assigned, wherein each final assembly line may be assigned to a particular, individual aircraft.

Each input parameter may comprise sub-categories, for example more detailed manufacturing tasks, such as electrical, mechanical or hydraulic tasks and testing, time groups, such as hours, days, weeks, seconds or even sub-seconds, testing tasks, or concrete changes in the manufacturing chain. These parameters are linked with each other in form of implicit and/or explicit rules and specific and logical sequences.

Furthermore, the input parameters that manage the manufacturing process may have an influence on the whole assembly process. Therefore, the definition of a manufacturing plan may require a general and precise overview of every issue involved and a concrete background of the consequences that may appear, if some parameters change, for example interdependencies within the assembly process.

Generation of the manufacturing plan may be performed in a flexible manner, so that a holistic manufacturing process may be mapped in sub-models and only a part of the whole process may be considered, for example only processes relating to electric installations within the manufacturing process.

In order to map the integral knowledge about the manufacturing process and to offer an optimized manufacturing process according to the defined input parameters, in-process parameters and output or evaluation parameters (KPI), rules, or different options, the aircraft assembly system may be capable of taking into account all these different parameters for generating the manufacturing plan.

Figure 5:
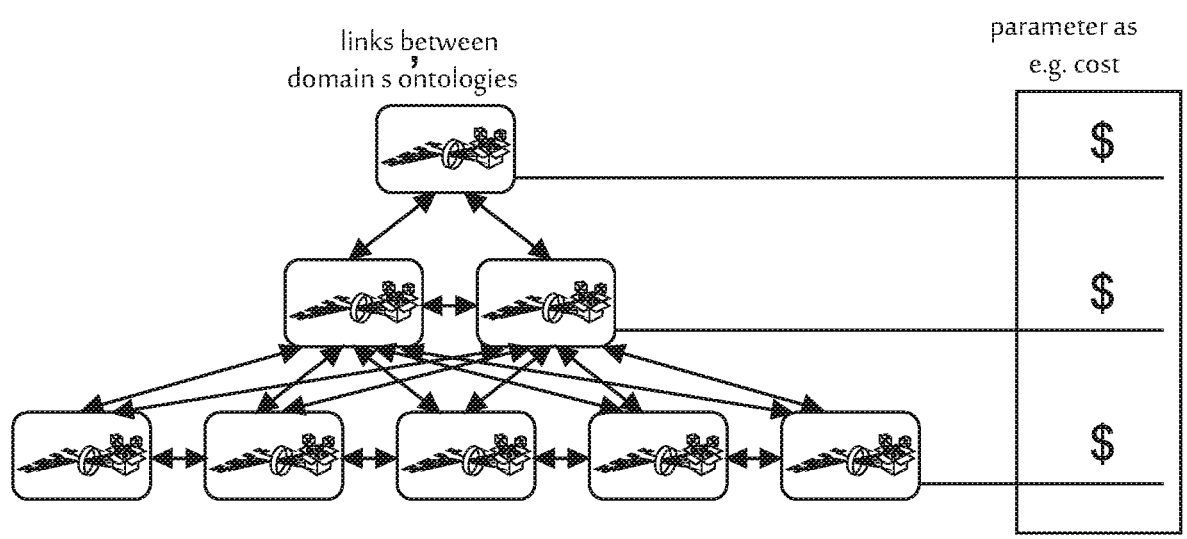
FIG. 5 shows a plurality of ontologies according to an exemplary embodiment of the present invention.

FIG. 5 shows possible links between domain ontologies. If several ontologies are taken into account, there may be the possibility to have an overall or detailed report of performance indicators, for example cost.

Figure 6:
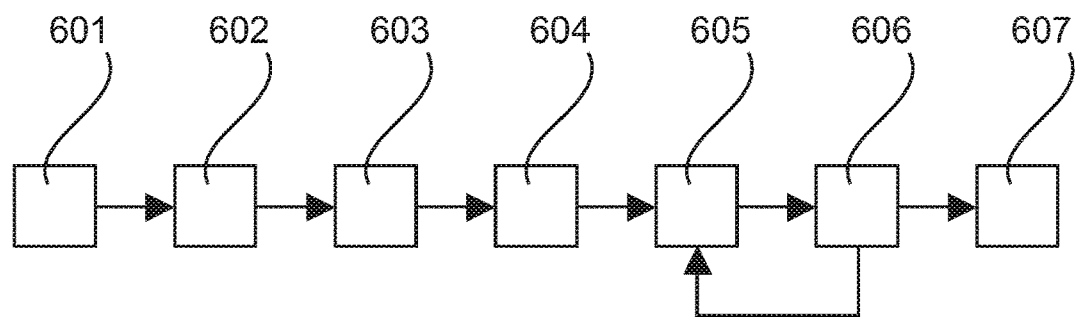
FIG. 6 shows a flow-chart of a method according to an exemplary embodiment of the present invention.

FIG. 6 shows a flow-chart of a method according to an exemplary embodiment of the present invention. In step 601, customer-specific design and/or configuration data, which relate to a configuration and/or design of the aircraft, are input into the system. In step 602, input parameters which relate to the expected time of delivery, number of personnel working in the aircraft assembly system, an apparatus of the system which cannot be used or resources available in the aircraft assembly system are input into the system.

In step 603, a set of rules is provided for components available for installation in the aircraft, for the customer-specific design and/or configuration data, and for the input parameters. In step 604, these rules are applied to the customer-specific design and/or configuration data and the input parameters in order to generate a manufacturing plan for assembling the aircraft in accordance with the set of rules. In step 605, the manufacturing plan is analyzed and one or more input parameters are altered, after which the manufacturing plan is generated once again.

In other words, by applying description logics, the processing unit generates a manufacturing plan in accordance with a set of rules and the input parameters. In order to improve the manufacturing plan, input parameters may be changed by the system in an iterative process. This may provide for an efficient use of resources available.

The new manufacturing plan is then compared to the older manufacturing plan in step 606, after which it is decided, which manufacturing plan is referred, for example because it provides a more efficient aircraft assembly. After that, the method may continue with step 605, in which one or more input parameters are changed again, resulting in a new manufacturing plan. If the system is satisfied the generated manufacturing plan, the method continues with step 607, in which the aircraft is assembled.

It should be noted that the term "comprising" does not rule out a plurality. It should further be noted that features described with reference to one of the above exemplary embodiments can also be used in combination with other features of other exemplary embodiments described above. Moreover, while at least one exemplary embodiment has been presented in the foregoing summary and detailed description, it should be appreciated that a vast number of variations exist. It should also be appreciated, that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the functional arrangement of elements described in an exemplary embodiment without departing from the scope as set forth in the appended claims and their legal equivalence.

What is claimed is:

1. A computer-based aircraft assembly system, comprising:
 a data base comprising a set of rules for interior equipment components available for installation in an aircraft; and
 a processor configured to:
  receive customer specific design or configuration data relating to a configuration or a design of the aircraft, wherein the customer specific design or configuration data comprises one or more of: a number of interior equipment components comprising a galley, a toilet module, a crew rest compartment, a cabin light, a stowage compartment, and a passenger seat; a position of each of the interior equipment components; or a shape or a material of one of the interior equipment components;
  receive input parameters relating to at least one of expected time of delivery, number of personnel working on aircraft assembly, an apparatus of the system which cannot be used, or resources available in the aircraft assembly system;
  generate a first manufacturing plan for assembling the aircraft, based on the received customer specific design or configuration data and based on the received input parameters, and generated in accordance with the set of rules, the first manufacturing plan configured to produce a first aircraft with a first configuration;
  automatically vary, in an iterative process, the received customer specific design or configuration data, the received input parameters, or both the received customer specific design or configuration data and the received input parameters to obtain altered data for changing the design or configuration of the aircraft, changing the manufacturing plan, or changing both the design or configuration of the aircraft and the manufacturing plan;
  generate a second manufacturing plan for assembling the aircraft, based on the altered data, and generated in accordance with the set of rules, wherein the second manufacturing plan comprises a different number, a different position, a different shape, or a different material of at least one of the interior equipment components compared to the first manufacturing plan, and wherein the second manufacturing plan is configured to produce a second aircraft with a second configuration different from the first aircraft with a first configuration;
  compare the first manufacturing plan to the second manufacturing plan; and
  select the first manufacturing plan or the second manufacturing plan in response to the comparison.

2. The aircraft assembly system of claim 1, wherein the processor is configured to control an assembling apparatus of the system, which is configured to assemble a part of the aircraft, in accordance with the manufacturing plan.

3. The aircraft assembly system of claim 1, wherein the processor is further configured to prioritize the input parameters, and to change only an input parameter which is of low priority.

4. The aircraft assembly system of claim 1, wherein:
 the data base comprises also rules for components which are not available for installation in the aircraft; and
 the processor is configured to select the set of rules for the components available for installation in the aircraft in the data base.

5. The aircraft assembly system of claim 1, wherein:
 the set of rules comprises a sub-set of deterministic rules which do not allow varying an input parameter relating to that sub-set; and
 the set of rules comprises a sub-set of non-deterministic rules which do allow varying an input parameter relating to that sub-set.

6. The aircraft assembly system of claim 1, wherein the processor is further configured to prioritize the rules of the set of rules, wherein a rule which is of low priority is disregarded, if observing one or more of the low priority rules would result in a manufacturing plan which contravenes a higher priority rule.

7. The aircraft assembly system of claim 1, wherein the processor processing unit is further configured to perform an error check of the manufacturing plan and/or the design and configuration of the aircraft, and to automatically vary an input parameter and/or the customer specific design data and/or configuration data in order to correct the error.

8. The aircraft assembly system of claim 1, wherein the manufacturing plan also comprises testing tasks for testing one or more components of the aircraft during assembly of the aircraft.

9. A method for aircraft assembly, the method comprising the steps of:
inputting customer specific design or configuration data relating to a configuration or a design of the aircraft, wherein the customer specific design or configuration data comprises one or more of: a number of interior equipment components comprising a galley, a toilet module, a crew rest compartment, a cabin light, a stowage compartment, and a passenger seat; a position of each of the interior equipment components; or a shape or a material of one of the interior equipment components;
inputting input parameters relating to at least one of expected time of delivery, number of personnel working on aircraft assembly, an apparatus of the system which cannot be used, or resources available in the aircraft assembly system;
providing a set of rules for the interior equipment components available for installation in the aircraft, for the customer specific design or configuration data, and for the input parameters; and
generating a first manufacturing plan for assembling the aircraft, based on the inputted customer specific design or configuration data and based on the inputted input parameters, and generated in accordance with the set of rules, the first manufacturing plan configured to produce a first aircraft with a first configuration;
automatically varying, in an iterative process, the inputted customer specific design or configuration data, the inputted input parameters, or both the inputted customer specific design or configuration data and the inputted input parameters to obtain altered data for changing the design or configuration of the aircraft, changing the manufacturing plan, or changing both the design or configuration of the aircraft and the manufacturing plan;
generating a second manufacturing plan for assembling the aircraft, based on the altered data, and generated in accordance with the set of rules, wherein the second manufacturing plan comprises a different number, a different position, a different shape, or a different material of at least one of the interior equipment components compared to the first manufacturing plan, and wherein the second manufacturing plan is configured to produce a second aircraft with a second configuration different from the first aircraft with a first configuration;
comparing the first manufacturing plan to the second manufacturing plan; and
selecting the first manufacturing plan or the second manufacturing plan in response to the comparing.

10. A non-transitory computer-readable medium comprising a program element which, when being executed by a processor of an aircraft assembly system, instructs the processor to:
receive customer specific design or configuration data relating to a configuration or a design of the aircraft, wherein the customer specific design or configuration data comprises one or more of: a number of interior equipment components comprising a galley, a toilet module, a crew rest compartment, a cabin light, a stowage compartment, and a passenger seat; a position of each of the interior equipment components; or a shape or a material of one of the interior equipment components;
receive input parameters relating to at least one of expected time of delivery, number of personnel working on aircraft assembly, an apparatus of the system which cannot be used" or resources available in the aircraft assembly system;
receive a set of rules for the interior equipment components available for installation in the aircraft, for the customer specific design or configuration data, and for the input parameters;
generate a first manufacturing plan for assembling the aircraft, based on the received customer specific design or configuration data and based on the received input parameters, and generated in accordance with the set of rules, the first manufacturing plan configured to produce a first aircraft with a first configuration;
automatically vary, in an iterative process, the received customer specific design or configuration data, the received input parameters, or both the received customer specific design or configuration data and the received input parameters to obtain altered data for changing the design or configuration of the aircraft, changing the manufacturing plan, or changing both the design or configuration of the aircraft and the manufacturing plan;
generate a second manufacturing plan for assembling the aircraft, based on the altered data, and generated in accordance with the set of rules, wherein the second manufacturing plan comprises a different number, a different position, a different shape, or a different material of at least one of the interior equipment components compared to the first manufacturing plan, and wherein the second manufacturing plan is configured to produce a second aircraft with a second configuration different from the first aircraft with a first configuration;
compare the first manufacturing plan to the second manufacturing plan; and
select the first manufacturing plan or the second manufacturing plan in response to the comparison.

* * * * *